United States Patent
Raichle

(10) Patent No.: US 9,956,648 B2
(45) Date of Patent: May 1, 2018

(54) PIERCING METAL WORKPIECES BY A LASER BEAM

(71) Applicant: TRUMPF Werkzeugmaschinen GmbH + Co. KG, Ditzingen (DE)

(72) Inventor: Florian Raichle, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 234 days.

(21) Appl. No.: 14/966,384

(22) Filed: Dec. 11, 2015

(65) Prior Publication Data

US 2016/0096239 A1     Apr. 7, 2016

Related U.S. Application Data

(63) Continuation of application No. PCT/EP2014/001533, filed on Jun. 5, 2014.

(30) Foreign Application Priority Data

Jun. 11, 2013   (DE) .................... 10 2013 210 857

(51) Int. Cl.
  *B23K 26/382*    (2014.01)
  *B23K 26/384*    (2014.01)
  (Continued)

(52) U.S. Cl.
  CPC .......... *B23K 26/382* (2015.10); *B23K 26/123* (2013.01); *B23K 26/1436* (2015.10); *B23K 26/384* (2015.10); *B23K 26/389* (2015.10)

(58) Field of Classification Search
  CPC .............. B23K 26/123; B23K 26/1436; B23K 26/382; B23K 26/384; B23K 26/389
  See application file for complete search history.

(56) References Cited

U.S. PATENT DOCUMENTS

| 4,945,207 A * | 7/1990 | Arai ................... B23K 26/14 |
| | | 219/121.64 |
| 5,747,769 A * | 5/1998 | Rockstroh ........... B23K 26/364 |
| | | 219/121.69 |

(Continued)

FOREIGN PATENT DOCUMENTS

| CN | 102896427 A | 1/2013 |
| DE | 102010003750 A1 | 10/2011 |

(Continued)

OTHER PUBLICATIONS

Machine translation of Japan Patent No. 2007-136,471-A, Jan. 2018.*

(Continued)

*Primary Examiner* — Geoffrey S Evans
(74) *Attorney, Agent, or Firm* — Fish & Richardson P.C.

(57) ABSTRACT

Methods and systems are implemented for piercing a metal workpiece by means of a laser beam and a process gas The methods and systems form a hole in the workpiece using the laser beam and using an inert gas as the process gas, such that the formed hole extends only partially through the workpiece, widen the upper part of the hole into a trough that surrounds the hole on the top side of the workpiece using the laser beam and using oxygen as the process gas, and fully pierce the hole using the laser beam and using oxygen as the process gas.

15 Claims, 3 Drawing Sheets

(51) Int. Cl.
*B23K 26/14* (2014.01)
*B23K 26/12* (2014.01)

(56) References Cited

U.S. PATENT DOCUMENTS

| | | | |
|---|---|---|---|
| 7,294,807 B2 * | 11/2007 | Callies | B23K 26/123 219/121.71 |
| 8,781,269 B2 | 7/2014 | Huber et al. | |
| 2005/0121613 A1 * | 6/2005 | Ito | B23K 26/06 250/324 |
| 2005/0230365 A1 * | 10/2005 | Lei | H01L 21/76898 219/121.71 |
| 2009/0053464 A1 * | 2/2009 | Fahndrich | F01D 5/186 219/121.71 |
| 2011/0198321 A1 * | 8/2011 | Walter | B23K 26/0054 219/121.71 |
| 2013/0026144 A1 | 1/2013 | Kurosawa et al. | |

FOREIGN PATENT DOCUMENTS

| | | | | |
|---|---|---|---|---|
| DE | 102012014323 | B4 | 6/2015 | |
| GB | 2236973 | A | 4/1991 | |
| JP | 60-255295 | A * | 12/1985 | |
| JP | 5-57469 | | 3/1993 | ............ B23K 26/00 |
| JP | 05057469 | | 3/1993 | |
| JP | 7-9175 | | 1/1995 | ............ B23K 26/00 |
| JP | 0791715 | A | 1/1995 | |
| JP | 0947888 | A | 2/1997 | |
| JP | 2007-136471 | A * | 6/2007 | |
| WO | WO2011131541 | A1 | 10/2011 | |

OTHER PUBLICATIONS

International Search Report from corresponding PCT Application No. PCT/EP2014/001533, dated Nov. 27, 2014, 4 pages.

* cited by examiner

PIERCING METAL WORKPIECES BY A LASER BEAM

CROSS-REFERENCE TO RELATED APPLICATIONS

This application is a continuation of and claims priority under 35 U.S.C. § 120 to PCT Application No. PCT/EP2014/001533 filed on Jun. 5, 2014, which claimed priority to German Application No. DE 102013210857.5, filed on Jun. 11, 2013. The contents of both of these priority applications are hereby incorporated by reference in their entirety.

TECHNICAL FIELD

The invention relates to systems and methods for piercing a workpiece by a laser beam and a process gas.

BACKGROUND

During laser-cutting, bulges of melted and resolidifying metal or metal oxide are formed in the area surrounding the piercing hole when piercing thick workpieces, the dimensions of said bulges increasing significantly with the thickness of the sheet metal. These adhesions around the piercing hole are an impediment, particularly with inner cutting geometries and small components, where the cutting contour necessarily runs along very close to the piercing site. Moreover, the distance sensor system of the laser machining head detects the bulges as an interfering contour and controls the movement of the laser machining head away from the workpiece, giving rise to processing problems. In order to avoid these problems, it is necessary to reduce or prevent bulges adhering to the workpiece.

Japanese patent publication JP05057469A discloses a piercing method in which a wide, shallow trough is produced in the surface or the workpiece in a first processing step with a large distance between the process gas nozzle on the machining head and the workpiece surface. A pierced hole is then produced with a smaller distance between the nozzle and the workpiece surface, a lower laser power and lower process gas pressure.

German patent publication DE102012014323A1 discloses producing, during piercing, a wide cylindrical hole in the upper half of the workpiece in a first process step with a large distance between the process gas nozzle and the workpiece surface. In a second process step disclosed in DE102012014323A1, the laser beam is then focused on the bottom surface of the wide hole, in order to produce a fully pierced hole. During this second step, the process gas is only directed into the wide hole and not at the area surrounding the hole.

SUMMARY

Various embodiments of the invention disclosed herein provide a quick piercing method that involves a small heat input into the workpiece during piercing. A low heat input during piercing is particularly advantageous for a defect-free contour cut in the area surrounding the piercing point.

In one aspect, the invention features a method for piercing a metal workpiece by a laser beam and a process gas comprising the following steps:

a) forming of a pierced hole in the workpiece that does not go all the way through by piercing the workpiece by means of the laser beam using an inert gas, in particular nitrogen, as the process gas;

b) widening of the upper part of the pierced hole into a trough that surrounds the pierced hole on the top side of the workpiece, in particular concentrically, by means of the laser beam which is set to a larger beam diameter on the workpiece than in step a) and using oxygen as the process gas; and c) full piercing of the pierced hole by means of the laser beam and using oxygen as the process gas.

In particular embodiments, in the two steps a) and b) a funnel-shaped partial piercing (piercing funnel) is formed on the top side of the workpiece which makes expelling of the melt easier. In step c) piercing then takes place down to the underside of the sheet metal, wherein the laser beam acts particularly well deep in the material due to the previously formed piercing funnel, which results in quick processing progress.

In the first process step a) of the piercing method according to the invention, the workpiece is pierced using a pulsed or continuous laser beam and an inert gas, preferably nitrogen, and a pierced hole is formed which does not extend right through the workpiece thickness. The pierced hole advantageously extends only into the upper half of the workpiece. The use of an inert gas as the process gas means that there is no uncontrolled burn-off of the workpiece material. Moreover, the energy input into the workpiece is kept low, which has a positive effect on machining accuracy during subsequent cutting of the contour.

The workpiece material which melts during piercing accumulates about the pierced hole and forms a bulge. In the second consecutive process step b) of the piercing method according to particular embodiments of the invention, the upper part of the pierced hole is widened due to the fact that as the beam diameter of the laser beam on the workpiece is greater than in step a) and oxygen is used as the process gas with pulsed or continuous laser radiation, a trough is produced in the top side of the workpiece, preferably concentrically to the pierced hole in particular embodiments.

In this second process step b), the bulge from the first step along with further material from the workpiece surface is oxidized by the oxygen and the oxidic slag thereby created is blown off by the process gas flow. A shallow trough is formed, from the bottom area whereof the pierced hole produced in the first step a) extends further into the inside of the workpiece. The trough therefore extends only fractionally as far into the workpiece as the pierced hole. In this way, a funnel-shaped hole is produced in the top side of the workpiece overall. The two-stage embodiment of the piercing funnel according to the invention has the advantage that there is no longer any workpiece material adhering to the workpiece surface about this hole and there is only a minimal heat input into the workpiece. A piercing funnel with a sharply defined edge and clean surrounding area is thereby produced.

In particular embodiments, the focal point of the laser beam in the first process step a) lies above the workpiece surface, so that a relatively wide pierced hole is produced as a subsequent "shaft" of the piercing funnel. The focal point of the laser beam in the second process step b) is arranged even further above the workpiece surface in particular embodiments and, in addition, the diameter of the laser beam in the focus, i.e. the focus diameter, is greater than in the first process step a). In this way, the power density of the laser beam on the workpiece surface is reduced and the beam diameter on the workpiece is enlarged, so that a shallow trough with a large diameter is created in the workpiece surface during irradiation of the workpiece.

The displacement of the laser focal point in a vertical direction may, for example, be achieved by displacing one or a plurality of lenses in the focusing optical system in the machining head or by adaptive mirrors in a free-beam optical system. In the case of fiber-guided laser radiation, the enlargement of the focus diameter can be achieved by switching between a fiber core and fiber cladding in a double-clad fiber, for example, between the laser and the machining head, as described in DE102010003750A1.

The distance of the machining head from the workpiece surface, i.e. the distance between the process gas nozzle and the workpiece surface, is also changed at least in addition in certain embodiments. Even during the first process step a), a comparatively large distance should be set between the process gas nozzle and the workpiece surface (of approx. 20 mm, for example), so that any contamination of the process gas nozzle by melted metal can be avoided. In the second process step b), the distance between the process gas nozzle and the workpiece surface is enlarged still further (e.g. to approx. 80 mm), so that the radiation surface on the workpiece surface is enlarged in particular embodiments.

Full piercing of the pierced hole right through to the underside of the workpiece takes place in the third process step c), in which the laser beam is positioned centrally above the pierced hole and, using oxygen as the process gas and with pulsed or continuous laser radiation, starting from the bottom of the piercing funnel the workpiece is pierced through, wherein the focal point of the laser beam may lie deeper than the funnel base in the workpiece on account of the funnel-shaped preliminary piercing. This has crucial advantages for efficient energy input during full piercing, as the laser beam can be focused deep in the material without shadows.

In addition, it has emerged that the funnel-shaped contour of the pierced hole produced in process steps a) and b) is particularly well suited to conveying the slag produced during further piercing (full piercing) far away from the pierced hole. This cools the melt before it returns to the workpiece surface, so that it does not adhere to said workpiece surface.

The method according to the invention can be implemented both on a solid-state laser cutting machine and also on a laser cutting machine with CO2 laser and is advantageous, particularly when piercing plate-shaped workpieces made of structural steel.

The distance between the process gas nozzle and the workpiece surface during full piercing is smaller (e.g. approx. 5 mm) than in the two process steps a) and b), in particular embodiments, so that the process gas can be effectively coupled in the pierced hole. Full piercing can take place either in an uncontrolled manner with continuously increasing laser power or in a controlled manner with the help of a piercing sensor system known in the art. The pierced hole produced in the first process step a) at the bottom of the trough produced in the second step is used in this third process step c) as a light channel for the laser beam. In this way, the laser radiation reaches the workpiece more effectively and a better depth action of the laser radiation is achieved. The fully pierced hole therefore has a significantly smaller diameter and there is a smaller heat input into the component than with customary piercing methods. In this way, less slag is created which could accumulate on the workpiece and a defect-free contour cut is made possible in the area surrounding the piercing point.

The three process steps a) to c) can be carried out discretely in succession. In this case, the laser beam is switched off following completion of the first process step a) and the machining head is moved upwards away from the workpiece vertically. During or after this, the process gas is changed from nitrogen to oxygen. The laser beam is then ignited and the second process step b) is executed. The positioning movement of the machining head between the second and third process step b), c) likewise takes place with the laser beam switched off. Alternatively, the three process steps a) to c) may follow one another continuously, wherein the laser beam remains switched on. The change in beam diameter on the workpiece surface takes place by moving the machining head vertically to the workpiece surface, for example. The gas changeover between the first and second process steps a), b) is carried out during movement of the machining head.

Following the full piercing of the workpiece, in an optional fourth process step d) the pierced hole can be enlarged before the actual cutting process begins. This is necessary if the focus diameter of the laser beam during the cutting of the workpiece is greater than during piercing. A wide kerf is then produced during cutting, wherein a large amount of melt is created. If the pierced hole is too narrow, the melt created at the start of cutting cannot be expelled from the workpiece downwards through the pierced hole quickly enough and a cutting tear can result.

In order to enlarge the pierced hole, the piercing point in the fourth processing step d) is irradiated with the laser beam set to a larger focus diameter than in the third process step c). The gas pressure of the process gas is set so high that the melt created is reliably expelled downwards out of the workpiece. The focal point of the laser beam is disposed beneath the workpiece surface, just as in the third process step c). The distance between the process gas nozzle and the workpiece surface corresponds to the distance in the third process step c). In particular embodiments, the focus diameter of the laser beam is increased gradually or continuously during the widening of the fully pierced hole. This increase in diameter may be achieved by moving the lenses in the machining head, for example, as described in WO2011131541A1. Alternatively or in addition, with a fiber-guided laser beam the beam path can be switched between the core and the cladding of a double-clad fiber, as described in DE102010003750A1. A continuous increase in the focus diameter up to the diameter for the subsequent cutting process increases the process reliability in a particular way when enlarging the fully pierced hole.

In particular embodiments, before step a), the top side of the workpiece is oiled, e.g. sprayed with oil, at the piercing point, in order to reduce the adhesion of any spatters that may be created in step a) and step b).

In a further aspect, the invention also relates to a laser processing machine comprising a laser beam generator, a movable laser machining head with a process gas nozzle from which the laser beam emerges along with the process gas, a device for selecting the process gas and a control system which is programmed to control the movement of the laser machining head and the selected process gas of the device according to the piercing method according to the invention.

The invention furthermore also relates to a computer program product which comprises code means adapted to execute all steps in the piercing method according to the invention when the program runs on a control system of a laser processing machine.

Further advantages and advantageous embodiments of the subject matter of the invention can be inferred from the description, the drawing and the claims. Likewise, the features referred to above and those listed further down can each be used individually or jointly in any combinations. The embodiments shown and described should not be regarded as a definitive list, but instead they are there to exemplify the description of the invention.

DETAILED DESCRIPTION

Figure 1:
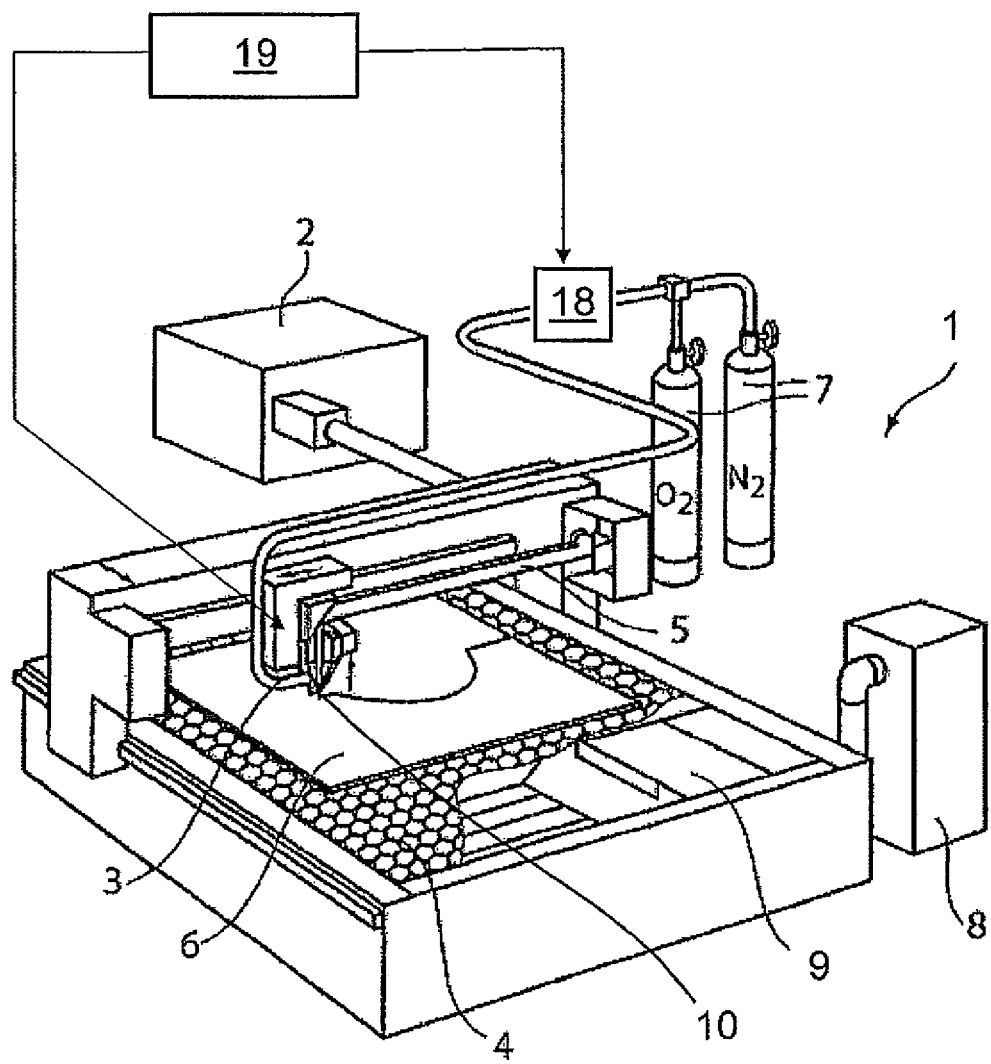
FIG. 1 shows a laser cutting machine suitable for executing the piercing method according to the invention.

FIG. 1 is a perspective view of a processing machine 1 which shows the structure of a laser cutting machine as an exemplary embodiment of a laser processing machine. Further exemplary embodiments are, for example, a laser welding machine or a combined punching/laser cutting machine. This processing machine 10 has, for example, a CO2 laser, diode laser or solid-state laser as laser beam generator 2, a movable laser machining head 3 and a workpiece support 4. A laser beam 5 is produced in the laser 2, which laser beam is guided by means of a fiber optic cable (not shown) or tilted mirrors (not shown) from the laser 2 to the machining head 3. A workpiece 6 is arranged on the workpiece support 4. The laser beam 5 is directed onto the workpiece 6 by means of a focusing optical system arranged in the machining head 3. The processing machine 1 is, moreover, supplied with process gases 7, for example oxygen or nitrogen. Alternatively or in addition, compressed air or application-specific gases can also be provided. The use of individual gases depends on the material of the workpiece 6 being machined and the quality requirements in relation to the cutting edges. Furthermore, a suction device 8 is provided which is connected to a suction channel 9 located beneath the workpiece support 4. The process gas 7 is fed to a process gas nozzle 10 of the processing head 3, from which it emerges along with the laser beam 5.

When cutting the workpiece 6 using oxygen as the process gas, the material of the workpiece 6 is melted and in large part oxidized. When using inert gases such as nitrogen or argon, for example, the material is only melted. The melted particles created are then blown out, possibly along with the iron oxides, and drawn out along with the cutting gas via the suction channel 9 by the suction device 8.

The individual process steps of the piercing method according to the invention are shown in a steel workpiece 6 in FIGS. 2a to 2d.

Figure 2A:
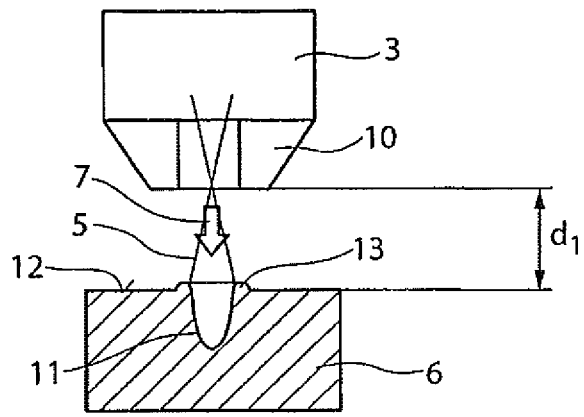
FIGS. 2a-2d show the individual process steps of the piercing method according to the invention.

In the first process step a) shown in FIG. 2a, the workpiece 6 is pierced by means of the pulsed or continuous laser beam 5 and using nitrogen as the process gas 7 and a pierced hole 11 is formed which does not extend all the way through the workpiece. The pierced hole 11 advantageously extends only into the upper half of the workpiece 6. Using nitrogen as the process gas 7 means that there is no uncontrolled burn-off of the workpiece material. Moreover, the energy input into the workpiece 6 is kept low, something which has a beneficial effect on the machining accuracy during the subsequent cutting of the contour.

The workpiece material which melts during piercing accumulates around the pierced hole 11 and forms a bulge 13 on the top side of the workpiece 12.

Figure 2B:
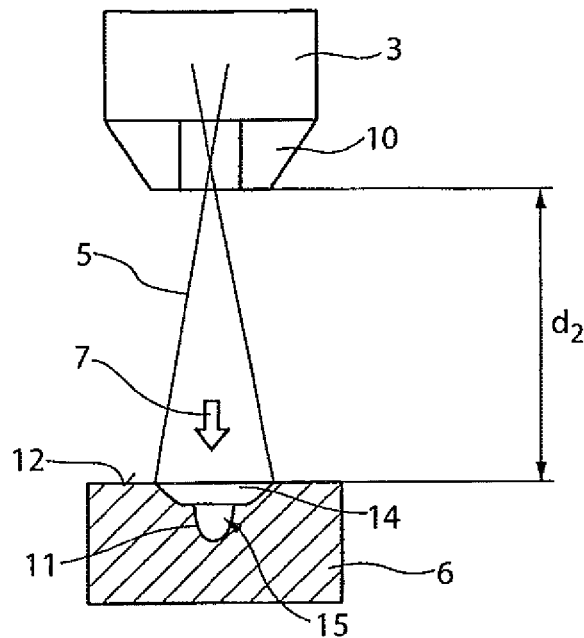

In the subsequent second process step b) shown in FIG. 2b, the upper part of the pierced hole 11 is widened in that by means of the laser beam 5 which is set to a larger beam diameter on the workpiece 6 than in step a) and using oxygen as the process gas 7 with pulsed or continuous laser irradiation, a trough 14 is produced in the top side of the workpiece 12 concentrically to the pierced hole 11.

In this second process step b) the bulge 13 from the first step a) along with further material from the workpiece surface is oxidized by the oxygen and the oxidic slag thereby created is blown off by the process gas flow emerging from the process gas nozzle 10. A shallow trough 14 is formed, from the bottom area whereof the pierced hole 11 produced in the first step a) extends further into the workpiece interior. The trough 14 therefore extends only fractionally as far into the workpiece 6 as the pierced hole 11. In this way, a funnel-shaped partial piercing (piercing funnel) 15 with a sharply defined edge and clean surrounding area is formed overall in the top side of the workpiece 12. The two-stage formation of the piercing funnel 15 has the advantage that there is no longer any workpiece material adhering to the top side of the workpiece 12 around this piercing funnel 15 and there is only a minimal heat input into the workpiece 6. Moreover, the piercing funnel 15 makes it easier for the melt to be expelled during the further full piercing of the workpiece 6.

The focal point of the laser beam 5 during the first process step a) preferably lies above the top side of the workpiece 12, so that a relatively wide pierced hole 11 is created as a subsequent "shaft" for the piercing funnel 15. It is particularly preferable for the focal point of the laser beam 5 to be arranged even further above the top side of the workpiece 12 in the second process step b) and, in addition, for the diameter of the laser beam 5 in the focus, i.e. the focus diameter, to be greater than in the first process step a). In this way, the power density of the laser beam 5 on the top side of the workpiece 12 is reduced and the beam diameter on the workpiece 6 enlarged, so that a flat trough 14 with a large diameter is formed during radiation of the workpiece 6 in the top side of the workpiece 12.

Even during the first process step a), a comparatively large distance d1 should be set between the process gas nozzle 10 and the top side of the workpiece 12 of approx. 20 mm, for example, so that contamination of the process gas nozzle 10 by the melted metal is avoided. In the second process step b), the distance d2 between the process gas nozzle 10 and the top side of the workpiece 12 is increased still further (d2>d1), e.g. to approx. 80 mm, so that the radiation surface on the top side of the workpiece 12 is enlarged.

Figure 2C:
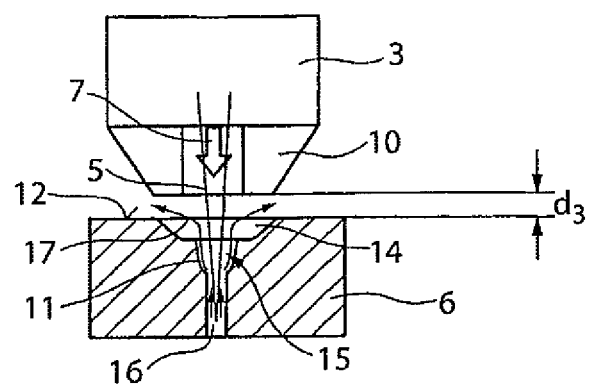

Full piercing of the pierced hole 11 right through to the underside of the workpiece 6 takes place in the third process step c) shown in FIG. 2c, in which the laser beam 5 is positioned centrally above the pierced hole 11 and, using oxygen as the process gas 7 and with pulsed or continuous laser radiation, starting from the bottom of the piercing funnel 15 the workpiece 6 is pierced through, wherein the focal point of the laser beam 5 may lie deeper than the funnel base in the workpiece 6 on account of the previously formed piercing funnel 15. This has crucial advantages for efficient energy input during full piercing, as the laser beam 5 can be focused deep in the material without shadows, which results in quick progress with the process.

In addition, it has emerged that the piercing funnel 15 produced in process steps a) and b) is particularly well suited to transporting the slag produced during further piercing (full piercing) in process step c) far away from the pierced hole 11, as indicated by the arrows 17 in FIG. 2c. This causes the melted material to cool before it returns to the workpiece surface, so that it does not adhere to the top side 12 of the workpiece.

The distance d3 between the process gas nozzle 10 and the top side of the workpiece during full piercing may be smaller (e.g. approx. 5 mm) than the distance d1, d2 in the two process steps a) and b), so that the process gas can be effectively coupled in the pierced hole 11 (d3<d1,d2). The pressure of the process gas can then be set lower than in process steps a) and b). Full piercing can take place either in an uncontrolled manner with continuously increasing laser power or in a controlled manner with the help of a piercing sensor system known in the art.

The pierced hole 11 produced in the first process step a) at the bottom of the trough 14 produced in the second process step b) is used in this third process step c) as a light channel for the laser beam 5. In this way, the laser radiation enters in the workpiece more effectively and a better depth action of the laser radiation is achieved. The full pierced hole 16 therefore has a significantly smaller diameter than the original pierced hole 11 and there is a smaller heat input into the workpiece 12 than with hitherto customary piercing methods.

Figure 3A:
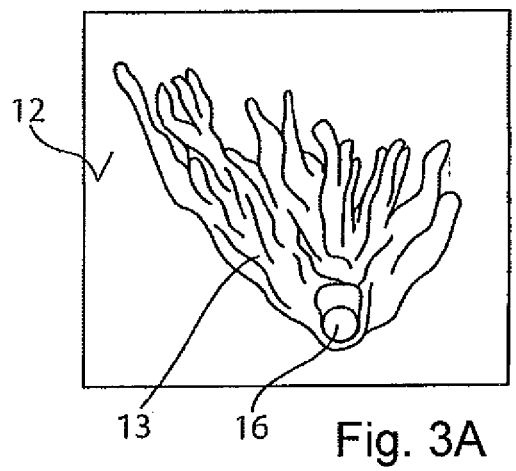
FIGS. 3a, 3b each show a photo of the workpiece top with a fully pierced hole which has been produced by a conventional piercing method (FIG. 3a) and by the piercing method according to the invention (FIG. 3b)
Figure 3B:
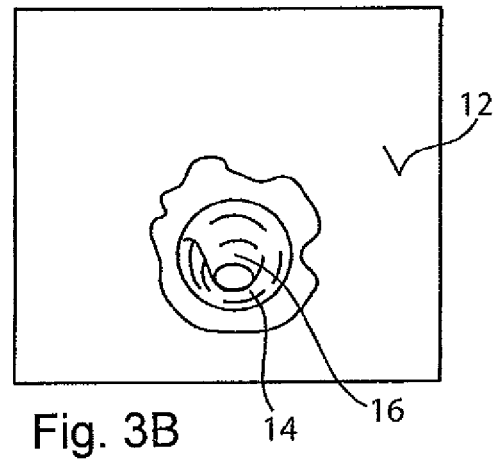

FIG. 3a shows a photo of the top side of the workpiece 12 with a fully pierced hole 16 which was produced by a conventional piercing method and FIG. 3b a photo of the top side of the workpiece 12 with a pierced hole 16 which has been produced by the piercing method according to the invention. While the workpiece top 12 shown in FIG. 3a is contaminated with slag bulge 13 around the fully pierced hole 16, significantly less slag has accumulated on the top side 12 of the workpiece in FIG. 3b, as a result of which a defect-free contour cut is made possible in the area surrounding the fully pierced hole 16.

Figure 4A:
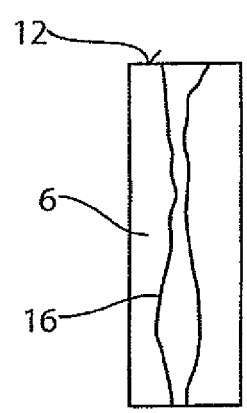
FIGS. 4a, 4b each show a cross-sectional photo of a fully pierced hole which was produced by a conventional piercing method (FIG. 4a) and by the piercing method according to the invention (FIG. 4b).
Figure 4B:
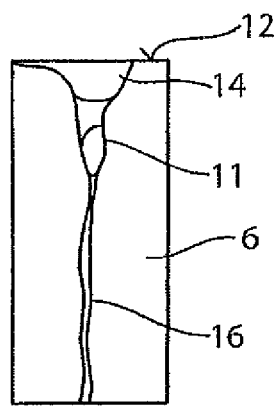

FIG. 4a shows a cross-sectional photo of a fully pierced hole 16 which was produced using a conventional piercing method and FIG. 4b shows a cross-sectional photo of a fully pierced hole 16 which was produced using the piercing method according to the invention. While the fully pierced hole 16 shown in FIG. 4a has an irregular, wide hole diameter over the entire workpiece thickness, the hole diameter of the fully pierced hole 16 shown in FIG. 4b widens out in controlled fashion over the workpiece thickness more evenly, narrowly and only on the top of the workpiece on account of the piercing funnel 15.

Figure 2D:
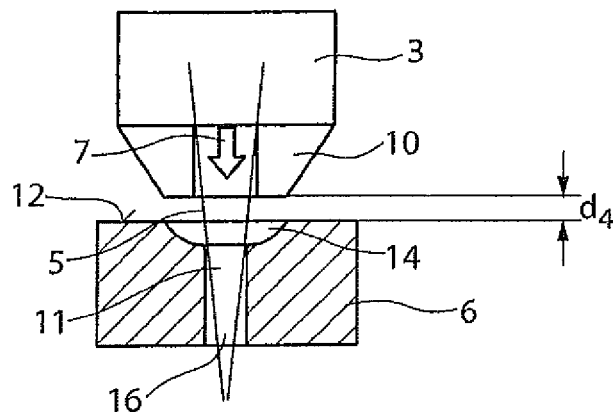

After the full piercing of the workpiece 6, as shown in FIG. 2d, in an optional fourth process step d), the fully pierced hole 16 can be enlarged before the actual cutting process begins. This is necessary if the focus diameter of the laser beam 5 during the cutting of the workpiece 6 is greater than during piercing. A wide kerf is then produced during cutting and a large amount of melt created. If the fully pierced hole 16 is too narrow, the melt created at the start of cutting cannot be expelled from the workpiece 6 downwards through the fully pierced hole 16 quickly enough and a cutting tear can result.

In order to enlarge the fully pierced hole 16, the piercing point in the fourth process step d) is irradiated with the laser beam 5 set to a larger focus diameter than in the third process step c). The gas pressure of the process gas 7 is set so high that the melt created is reliably expelled downwards out of the workpiece 6. The focal point of the laser beam 5 is disposed beneath the workpiece top, just as in the third process step c). The distance d4 between the process gas nozzle 10 and the top side 12 of the workpiece corresponds to the distance d3 in the third process step c), in other words, d4=d3.

As shown in FIG. 1, the laser processing machine 1 further comprises a device (e.g. a changeover valve) 18 for selecting the process gas fed to the process gas nozzle 10 and a control system 19 which is programmed to control the traversing movement of the laser machining head 3 along with its process gas nozzle 10 and also the selected process gas 7 of the device 18 according to the piercing method described above.

A number of embodiments of the invention have been described. Nevertheless, it will be understood that various modifications may be made without departing from the spirit and scope of the invention. Accordingly, other embodiments are within the scope of the following claims.

What is claimed is:

1. A method of piercing a workpiece using a laser beam and a process gas, the method comprising:
   forming a hole in the workpiece using the laser beam and using an inert gas as the process gas, such that the formed hole extends only partially through the workpiece;
   widening the upper part of the hole into a trough that surrounds the hole on the top side of the workpiece using the laser beam and using oxygen as the process gas; and then
   fully piercing the hole through the workpiece using the laser beam and using oxygen as the process gas.

2. The method according to claim 1, further comprising, before the forming of the hole extending only partially through the workpiece, oiling a top side of the workpiece at a piercing point.

3. The method according to claim 1, wherein the widening of the upper part of the pierced hole into a trough that surrounds the hole on the top side of the workpiece includes widening the upper part using the laser beam set to a larger beam diameter during the widening than a beam diameter of the laser during the forming of the hole extending only partially through the workpiece.

4. The method according to claim 1, wherein the laser beam during the widening of the upper part of the hole into a trough is coaxial to the laser beam during the forming of the hole extending only partially through the workpiece.

5. The method according to claim 1, wherein the forming of the hole extending only partially through the workpiece includes positioning a focal point of the laser beam above the top side of the workpiece.

6. The method according to claim 1, wherein the widening of the upper part of the hole includes positioning a focal point of the laser beam further above the top side of the workpiece than during the forming of the hole extending only partially through the workpiece.

7. The method according to claim 1, wherein the step of fully piercing includes positioning a focal point of the laser beam beneath the top side of the workpiece.

8. The method according to claim 1, wherein a focus diameter of the laser beam during the widening of the upper part of the hole into a trough is greater than during the forming of the hole extending only partially through the workpiece.

9. The method according to claim 1, further comprising, after the forming of the hole extending only partially through the workpiece and before the widening of the upper part of the hole into a trough, moving the gas nozzle away from the workpiece.

10. The method according to claim 1, further comprising, before fully piercing the hole, moving the gas nozzle closer to the workpiece than during the forming of the hole extending only partially through the workpiece.

11. The method according to claim 1, wherein a pressure of the process gas during the fully piercing of the pierced hole is smaller than during the forming of the hole extending only partially through the workpiece and the widening of the upper part of the hole into a trough.

12. The method according to claim 1, wherein the widening of the upper part of the hole into a trough directly follows the forming of the hole extending only partially through the workpiece, and wherein the fully piercing of the hole directly follows the widening of the upper part of the hole into a trough, and wherein the laser beam remains continuously switched on and a change in beam diameter on the top side of the workpiece takes place by moving a machining head perpendicular to a top side of the workpiece, and wherein the change of the process gas between the forming of the hole extending only partially through the workpiece and the widening of the upper part of the hole is carried out during movement of the machining head.

13. The method according to claim 1, further comprising enlarging a diameter of the pierced hole after the fully piercing of the hole, by irradiating with the laser beam set to a larger focus diameter than during the fully piercing of the hole.

14. The method according to claim 13, further wherein enlarging the diameter of the pierced hole includes gradually increasing the focus diameter of the laser beam.

15. The method according to claim 13, wherein enlarging the diameter of the pierced hole includes continuously increasing the focus diameter of laser beam up to a subsequent cutting process focus diameter.

\* \* \* \* \*

UNITED STATES PATENT AND TRADEMARK OFFICE
CERTIFICATE OF CORRECTION

PATENT NO. : 9,956,648 B2  
APPLICATION NO. : 14/966384  
DATED : May 1, 2018  
INVENTOR(S) : Florian Raichle Page 1 of 1

It is certified that error appears in the above-identified patent and that said Letters Patent is hereby corrected as shown below:

On the Title Page

Column 2, Item (57), Line 2, after "gas" insert -- . --

Signed and Sealed this  
Twenty-third Day of July, 2019

Andrei Iancu  
*Director of the United States Patent and Trademark Office*